UNITED STATES PATENT OFFICE.

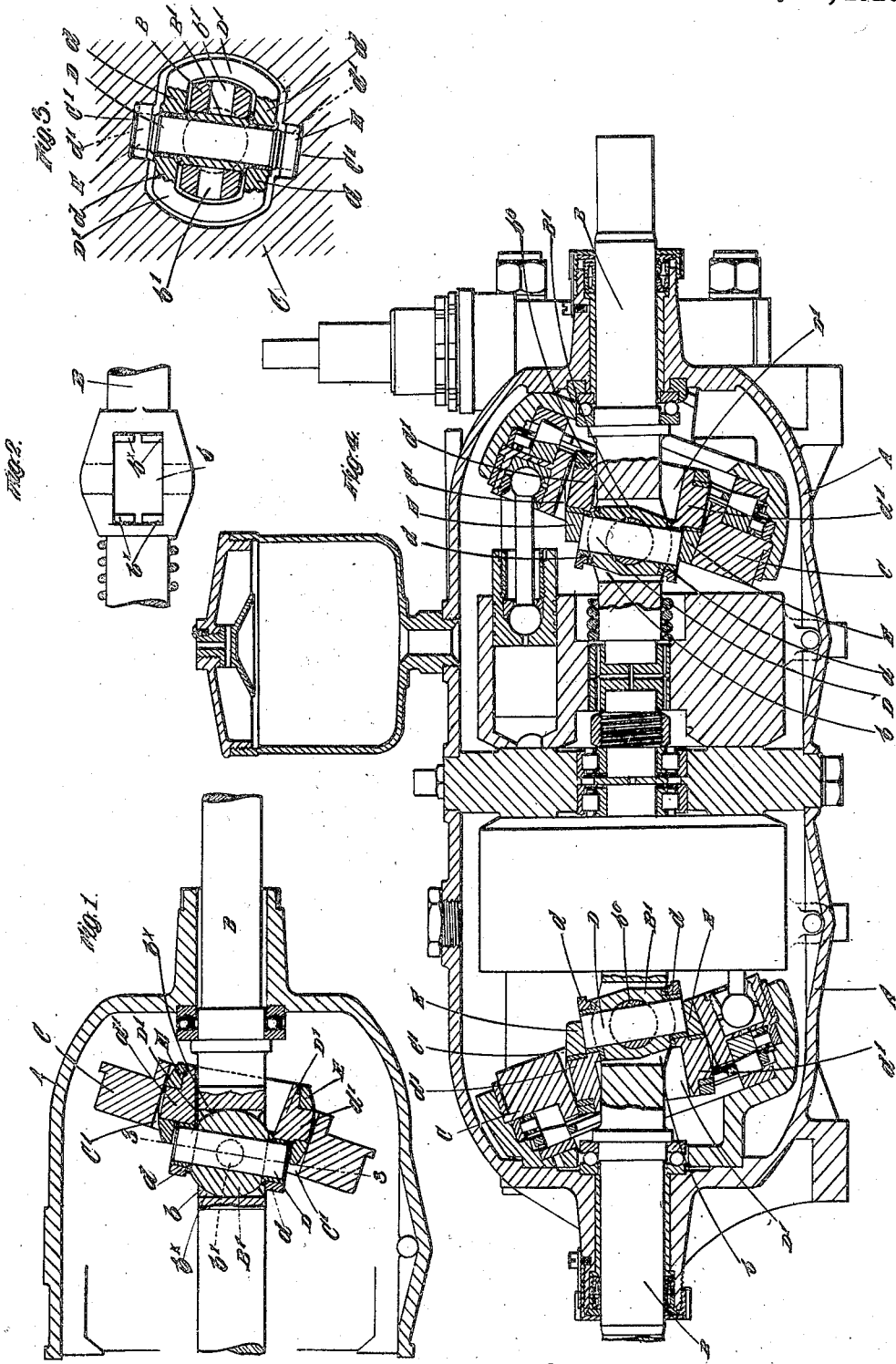

MAURICE KERR INGOLDBY, OF WESTMINSTER, LONDON, ENGLAND, ASSIGNOR TO VICKERS LIMITED, OF WESTMINSTER, LONDON, ENGLAND.

POWER-TRANSMISSION DEVICE.

1,340,447.  Specification of Letters Patent.  Patented May 18, 1920.

Application filed October 2, 1918. Serial No. 256,624.

*To all whom it may concern:*

Be it known that I, MAURICE KERR INGOLDBY, a subject of the King of Great Britain, residing at Vickers House, Broadway, Westminster, in the county of London, England, have invented certain new and useful Improvements in or Relating to Power-Transmission Devices, of which the following is a specification.

This invention relates to power transmission devices and more especially to hydraulic pumps and motors of the swash-plate type comprising a rotary cylinder-barrel or body having a number of cylinders arranged parallel to the axis of rotation of the said barrel and adapted to receive pistons whose rods are carried at their outer ends by a swash-plate or socket ring rotatably mounted in a so-called tilting box or angle box which can be adjusted to assume different inclinations to vary the stroke of the pistons or which is permanently set at a fixed inclination to give a constant stroke to the pistons.

The power transmission device is provided with improved means for enabling a constant angular velocity during each revolution to be obtained, the said means comprising a double universal joint which according to the present invention is placed between the shaft and a revolving member (such as the aforesaid socket ring) surrounding the shaft, the said double universal joint being preferably composed of a joint of the pin or Hooke's type and a joint of the sliding block or de Dion type.

In order that the said invention may be clearly understood and readily carried into effect the same will be described more fully with reference to the accompanying drawings, in which:—

Figure 1 is a longitudinal section showing a constructional form of the aforesaid double universal joint employed in a pump or motor of the swash-plate type.

Fig. 2 is a plan of part of the shaft shown in Fig. 1.

Fig. 3 is a section taken approximately on the line 3, 3 of Fig. 1, and

Fig. 4 is a longitudinal section showing a variable speed hydraulic transmission gear, the pump and motor units of which are of the swash-plate type and are provided with a form of the aforesaid double universal joint differing in certain constructional features from that shown by Figs. 1 to 3.

A is the pump or motor casing, B is the driven or the driving shaft and C is the socket ring or swash plate surrounding the shaft B.

Referring more particularly to Figs. 1 to 3, part of the shaft B is enlarged (see Fig. 2) and is formed with a transverse slot $b$ for the reception of a block B' which has cylindrical surfaces disposed in contact with corresponding bearing surfaces $b^x$, $b^x$ at the ends of the said slot. The side walls of the slot $b$ are formed with holes $b'$, $b'$ for enabling the surfaces $b^x$, $b^x$ to be machined. A pin D passes through the block at right angles to the axis of its cylindrical surfaces, this pin being disposed in holes in lugs $d$, $d$ on a yoke D' which has trunnions $d'$, $d'$ engaging in holes in cylindrical block segments E, E. The axis of the trunnions $d'$, $d'$ is situated parallel to the axis of the pin D, and the said cylindrical block segments are disposed in slots C', C' formed in the socket ring C, the flat surfaces of the segments bearing against the side walls of this slot so as to transmit movement to the ring or to transmit movement from the ring to the segments as the case may be. The portion of the block B' disposed between the lugs $d$, $d$ is formed with flat surfaces the distance between which is less than the minimum distance between the bearing surfaces $b^x$, $b^x$. In this manner by displacing the block B' from the position shown by Fig. 1, through an angle of about 90° around the axis of the holes $b'$, $b'$ the block can be removed from the slot $b$ after the part C, D, D' and E have been removed and can also be readily placed in its operative position in the slot.

The parts B', D and D' form the first half of the double universal joint and constitute a joint of the pin or Hooke's type, and the parts D', $d'$ and E form the second half and constitute a joint of the sliding block or de Dion type, the part D' being common to both halves. The varying angular velocities between the shaft B and the part D' are counteracted by oppositely varying angular velocities between the part D' and the socket ring C so that there is no varying angular velocity between the shaft and the ring.

The form of double universal joint shown by Fig. 4 is similar to that of Figs. 1 to 3 except that the surfaces $b^×$, $b^×$ are dispensed with by providing a pin $b^0$ which passes transversely through the block and is disposed in holes in the side walls of the slot $b$; the aforesaid pin D passes through a transverse hole in the pin $b^0$ to retain the latter in position.

The positions of the aforesaid joints may, in either construction, be reversed, the pin joint being connected to the socket ring C and the sliding block joint connected to the shaft.

It is to be observed that either of the forms of double universal joint can be used not only in mechanism where the member surrounding the shaft is set at a fixed angle to the shaft or is capable of being rocked relatively to the shaft about a center situated in the axis of the shaft (as is the case with the swash-plate of a pump or motor) but also in mechanism where the said shaft-surrounding member is situated in, or is capable of adjustment to, a position in which its axis is parallel to the axis of the shaft. The said double universal joints can also be used in mechanism where the said shaft-surrounding member is arranged at a fixed angle to the shaft (or is capable of being rocked relatively to the shaft) and can also partake of bodily movement toward and away from the shaft, that is to say to mechanism in which the axis of the shaft-surrounding member intersects the axis of the shaft at different points along the latter axis. Thus the double universal joint, in addition to insuring constant angular velocity between the shaft and the shaft-surrounding member, also combines the adjustment advantages of an Oldham or similar coupling or joint with those of a Hooke's or similar coupling or joint.

What I claim and desire to secure by Letters Patent of the United States is:

1. The combination with a rotary driving member and a rotary driven member, of a combined pin-joint and sliding block-joint connection between said members for causing the driven member to rotate at a constant angular velocity throughout each revolution.

2. The combination of a shaft, an annulus adapted to rotate with the shaft and about an axis at an angle to the axis of rotation of the shaft, a second shaft to which the annulus is operatively connected, and two universal connections between the annulus and the first-named shaft on which it is mounted, said connections causing the annulus and said shaft to rotate with the same angular velocity throughout each revolution.

3. The combination with a shaft and a member surrounding and revolving with the shaft and about an axis at an angle to the axis of rotation of the shaft, of a connection between the shaft and said member including two joints coöperating to transmit rotary motion between the shaft and member at a constant angular velocity throughout each revolution.

4. The combination with a shaft and a member surrounding and revolving with the shaft and about an axis at an angle to the axis of rotation of the shaft, of a pin joint and a sliding block joint connecting the shaft and member and serving to transmit rotary motion from one to the other at a constant angular velocity throughout each revolution.

5. The combination with a shaft and a revolving member surrounding the shaft, of a block disposed in a slot in said shaft so as to be free to move about an axis at right angles to the axis of the shaft, a yoke connected to said block so as to be free to move about an axis at right angles to the axis of movement of the block, cylindrical block segments disposed in slots formed in said revolving member so that said member can move relatively to said segments about an axis parallel to the axis of movement of the block and means for connecting said segments to said yoke so that they can move relatively to the yoke about an axis parallel to the axis of movement of said yoke.

6. The combination with a shaft and a revolving member surrounding the shaft, of a block disposed in a slot in said shaft so as to be free to move about an axis at right angles to the axis of the shaft, a pin passing through said block at right angles to the axis of movement of the block, a yoke loosely mounted on the protruding ends of said pin, trunnions on said yoke the axis of these trunnions being parallel to the axis of said pin, and a cylindrical block segment loosely mounted on each of said trunnions, these block segments being disposed in slots formed in said revolving member so that the latter can move relatively to the segments about an axis parallel to the axis of movement of said block.

7. The combination with a shaft and a revolving member surrounding the shaft, of a block having cylindrical surfaces disposed in contact with corresponding bearing surfaces in a slot in said shaft so as to be free to move about an axis at right angles to the axis of the shaft, a pin passing through said block at right angles to the axis of movement of the block, a yoke loosely mounted on the protruding ends of said pin, trunnions on said yoke the axis of these trunnions being parallel to the axis of said pin, and a cylindrical block segment loosely mounted on each of said trunnions, these block segments being disposed in slots formed in said revolving member so that the latter can move relatively to the segments about an axis parallel to the axis of movement of said block.

8. The combination with a shaft and a revolving member surrounding the shaft, of a block disposed in a slot in said shaft, a pin passing through said block and mounted in the walls of said slot so that the block can move about an axis at right angles to the axis of the shaft, a second pin passing through said block and through the first mentioned pin at right angles to the axis of movement of the block, a yoke loosely mounted on the protruding ends of said second pin, trunnions on said yoke the axis of these trunnions being parallel to the axis of said second pin, a cylindrical block segment loosely mounted on each of said trunnions, these block segments being disposed in slots formed in said revolving member so that the latter can move relatively to the segments about an axis parallel to the axis of the first mentioned pin.

In testimony whereof I affix my signature.

MAURICE KERR INGOLDBY.